US00RE39195E

(19) United States
(12) Reissued Patent
Doan et al.

(10) Patent Number: US RE39,195 E
(45) Date of Reissued Patent: Jul. 18, 2006

(54) POLISHING PAD REFURBISHER FOR IN SITU, REAL-TIME CONDITIONING AND CLEANING OF A POLISHING PAD USED IN CHEMICAL-MECHANICAL POLISHING OF MICROELECTRONIC SUBSTRATES

(75) Inventors: Trung T. Doan, Los Gatos, CA (US); Gurtej S. Sandhu, Boise, ID (US)

(73) Assignee: Micron Technology, Inc., Boise, ID (US)

(21) Appl. No.: 10/054,692

(22) Filed: Dec. 19, 2001

Related U.S. Patent Documents

Reissue of:
(64) Patent No.: 6,004,196
Issued: Dec. 21, 1999
Appl. No.: 09/032,230
Filed: Feb. 27, 1998

(51) Int. Cl.
*B24B 7/08* (2006.01)

(52) U.S. Cl. ..... 451/443; 451/444; 451/287; 451/290

(58) Field of Classification Search ..... 451/287, 451/288, 290, 443, 444
See application file for complete search history.

(56) References Cited

U.S. PATENT DOCUMENTS

| | | | | | |
|---|---|---|---|---|---|
| 5,584,751 | A | | 12/1996 | Kobayashi et al. | 451/288 |
| 5,595,527 | A | | 1/1997 | Appel et al. | 451/28 |
| 5,664,987 | A | | 9/1997 | Renteln | 451/21 |
| 5,749,771 | A | * | 5/1998 | Isobe | 451/41 |
| 5,775,983 | A | | 7/1998 | Shendon et al. | 451/444 |
| 5,782,675 | A | | 7/1998 | Southwick | 451/56 |
| 5,785,585 | A | | 7/1998 | Manfredi et al. | 451/288 |
| 5,823,854 | A | | 10/1998 | Chen | 451/9 |
| 5,851,138 | A | | 12/1998 | Hempel, Jr. | 451/56 |
| 5,857,899 | A | * | 1/1999 | Volodarsky et al. | 451/72 |
| 5,885,137 | A | | 3/1999 | Ploessl | 451/56 |
| 5,885,147 | A | | 3/1999 | Kreager et al. | 451/443 |
| 5,902,173 | A | * | 5/1999 | Tanaka | 451/56 |
| 5,931,725 | A | * | 8/1999 | Inaba et al. | 451/288 |
| 6,004,193 | A | * | 12/1999 | Nagahara et al. | 451/285 |
| 6,019,670 | A | * | 2/2000 | Cheng et al. | 451/56 |
| 6,077,155 | A | * | 6/2000 | Hayakawa et al. | 451/288 |
| 6,135,868 | A | * | 10/2000 | Brown et al. | 451/443 |

* cited by examiner

*Primary Examiner*—Robert A. Rose
(74) *Attorney, Agent, or Firm*—Dorsey & Whitney LLP

(57) ABSTRACT

A pad refurbisher that provides in situ, real-time conditioning and/or cleaning of a polishing surface on a polishing pad used in chemical-mechanical polishing of a semiconductor wafer and other microelectronic substrates. The pad refurbisher has a body adapted for attachment to a wafer carrier of a chemical-mechanical polishing machine, and a refurbishing element connected to the body. The body has a distal face positioned proximate to a perimeter portion of the wafer carrier and facing generally toward the polishing surface of the polishing pad. The body travels with the wafer carrier as the wafer carrier moves over the polishing pad. The refurbishing element is connected to the distal face of the body so that the refurbishing element can operatively engage the polishing surface substantially adjacent to the perimeter of the wafer carrier. The refurbishing element is a pad conditioning device and/or a pad cleaning device that conditions and/or cleans the polishing surface of the pad to remove waste particles from the polishing surface of the polishing pad and place the pad in a desired polishing condition. In operation, the refurbishing element travels with the wafer carrier and is selectively engaged with the polishing surface while the wafer carrier presses the wafer against the polishing surface to selectively condition and/or clean generally only the deteriorated areas on the pad.

71 Claims, 5 Drawing Sheets

POLISHING PAD REFURBISHER FOR IN SITU, REAL-TIME CONDITIONING AND CLEANING OF A POLISHING PAD USED IN CHEMICAL-MECHANICAL POLISHING OF MICROELECTRONIC SUBSTRATES

Matter enclosed in heavy brackets [ ] appears in the original patent but forms no part of this reissue specification; matter printed in italics indicates the additions made by reissue.

TECHNICAL FIELD

The present invention relates to an apparatus for selectively cleaning and conditioning the surface of a polishing pad used in chemical-mechanical polishing of semiconductor wafers and other microelectronic substrates.

BACKGROUND OF THE INVENTION

Chemical-mechanical polishing ("CMP") processes remove material from the surface of a wafer in the production of ultra-high density integrated circuits. In a typical CMP process, a wafer is pressed against a polishing pad in the presence of a slurry under controlled chemical, pressure, velocity, and temperature conditions. The slurry solution generally contains small, abrasive particles that abrade the surface of the wafer, and chemicals that etch and/or oxidize the surface of the wafer. The polishing pad is generally a planar pad made from a relatively soft, porous material such as blown polyurethane. Thus, when the pad and/or the wafer moves with respect to the other, material is removed from the surface of the wafer by the abrasive particles (mechanical removal) and by the chemicals in the slurry (chemical removal).

FIG. 1 schematically illustrates a conventional CMP machine 10 with a platen 20, a wafer carrier 30, a polishing pad 40, and a slurry 44 on the polishing pad. An under-pad 25 is typically attached to the upper surface 22 of platen 20, and the polishing pad 40 is positioned on the under-pad 25. A drive assembly 26 rotates the platen 20 as indicated by arrow A, or in another existing CMP machine the drive assembly 26 reciprocates the platen 20 back and forth as indicated by arrow B. The motion of the platen 20 is imparted to the pad 40 through the under-pad 25 because the polishing pad 40 frictionally engages the under-pad 25. The wafer carrier 30 has a lower surface 32 to which a wafer 12 may be attached, or the wafer 12 may be attached to a resilient pad 34 positioned between the wafer 12 and the lower surface 32. The wafer carrier 30 may be a weighted, free-floating wafer carrier, or an actuator assembly 36 may be attached to the wafer carrier 30 to impart axial and rotational motion, as indicated by arrows C and D, respectively.

In the operation of the conventional planarizer 10, the wafer 12 is positioned face-downward against the polishing pad 40, and then the platen 20 and the wafer carrier 30 move relative to one another. As the face of the wafer 12 moves across the planarizing surface 42 of the polishing pad 40, the polishing pad 40 and the slurry 44 remove material from the wafer 12.

In the competitive semiconductor industry, it is desirable to maximize the throughput of the finished wafers and minimize the number of defective or impaired devices on each wafer. The throughput of CMP processes is a function of several factors, one of which is the rate at which the thickness of the wafer decreases as it is being planarized (the "polishing rate"). Because the polishing period per wafer decreases with increasing polishing rates, it is desirable to maximize the polishing rate within controlled limits to increase the number of finished wafers that are produced in a given period of time.

One problem with CMP processing is that the throughput may drop because the condition of the polishing surface on the pad deteriorates while polishing a wafer. The deterioration of the polishing pad surface is caused by waste particles from the wafer, pad, and slurry that accumulate on the polishing surface of the polishing pad. Since the accumulations of waste particles alter the condition of the polishing surface on the polishing pad, the polishing rate tends to drift over time. For example, after polishing a single wafer for only 4 minutes with a Rodel IC-1000 polishing pad and a Rodel ILD-1300 slurry (both of which are manufactured by Rodel Corp. of Arizona), the polishing rate drops and reduces the throughput for semiconductor wafers. Many semiconductor manufacturers accordingly recondition the pad after each wafer, but unless the reconditioning process is performed in situ and in real-time, then the reconditioning of the pad also causes down-time that reduces throughput. Thus, the waste particles on the polishing surface reduce the throughput of the CMP process.

CMP processes must also consistently and accurately produce a uniform, planar surface on the wafer because it is important to accurately focus the image of circuit patterns on the surface of the wafer. As the density of integrated circuits increases, it is often necessary to accurately focus the critical dimensions of the circuit pattern to better than a tolerance of approximately 0.1 μm. Focusing the circuit patterns to such small tolerances, however, is very difficult when the distance between the emission source and the surface of the wafer varies because the surface of the wafer is not uniformly planar. In fact, several devices may be defective on a wafer with a non-[uniformnly] *uniformly* planar surface. Thus, CMP processes must create a highly uniform, planar surface.

Another problem with CMP processing is that the accumulations of waste particles reduce the uniformity of the polished surface because they do not accumulate uniformly across the polishing surface of the pad. The polishing rate accordingly varies from one region on the pad to another resulting in a nonuniform polished surface on the wafer. Therefore, in light of the problems associated with accumulations of waste particles on polishing pads, it is necessary to periodically clean and condition the polishing surface to remove such accumulations and bring the polishing pad back to a desired condition.

Polishing surfaces on polishing pads are typically cleaned by brushing the pad with a brush, or by flushing the pad with a fluid. To perform the brushing and flushing processes, the wafer is generally removed from the pad while the brush or fluid engages the polishing surface of the polishing pad. One problem with the brushing and flushing processes, therefore, is that a significant amount of down-time is necessary to merely clean the polishing pad. Thus, it would be desirable to develop a pad cleaner that effectively cleans the pad in situ and in real-time.

Polishing surfaces of polishing pads are typically conditioned with a diamond embedded plate mounted to a separate device that moves the plate across the polishing pad to abrade the surface of the pad. Some pad conditioners remove a portion of the upper layer of the deteriorated polishing surface to form a new, clean polishing surface. One problem with conventional pad conditioners is that they condition the pad substantially uniformly across the polishing surface. Since the wafers only polish on a well-defined area of the pad (usually a concentric band spaced radially away from both the center of the pad and the perimeter of the pad), the pad conditioning needs to be performed proportionate to the pad surface wear. Moreover, it is desirable to condition a pad in situ and in real-time to avoid costly down-time associated with conditioning processes that stop the polishing of the wafer. Thus, it would be desirable to develop a device for selectively conditioning areas on the pad that require conditioning in situ and in real-time.

SUMMARY OF THE INVENTION

The inventive pad refurbisher provides in situ, real-time conditioning and/or cleaning of a polishing surface on a polishing pad used in chemical-mechanical polishing of a semiconductor wafer. The pad refurbisher has a body adapted for attachment to a wafer carrier of a chemical-mechanical polishing machine, and a refurbishing element connected to the body. The body has a face positioned proximate to a perimeter portion of the wafer carrier and facing generally toward the polishing surface of the polishing pad. The body travels with the wafer carrier as the wafer carrier moves over the polishing pad. The refurbishing element is connected to the face of the body so that the refurbishing element can operatively engage the polishing surface substantially adjacent to the perimeter of the wafer carrier. The refurbishing element is a pad conditioning device and/or a pad cleaning device that conditions and/or cleans the polishing surface of the pad to remove waste particles from the polishing surface of the polishing pad and place the pad in a desired polishing condition. In operation, the refurbishing element travels with the wafer carrier and is selectively engaged with the polishing surface while the wafer carrier presses the wafer against the polishing surface to selectively condition and/or clean generally only the deteriorated areas on the pad.

In one embodiment, the face of the body is a distal face defining a ring positioned radially outwardly from the perimeter of the wafer carrier, and the refurbishing element is either a diamond embedded pad conditioner or a brush-like pad cleaner. In another embodiment, the body has a first ring with a first refurbishing element and a second ring with a second refurbishing element. The first ring is positioned radially outwardly from the perimeter of the wafer carrier, and the second ring is positioned radially outwardly from the first ring. The first refurbishing element is preferably a brush-like pad cleaner and the second refurbishing element is preferably a diamond embedded pad conditioner.

DETAILED DESCRIPTION OF THE INVENTION

The present invention is a CMP polishing pad refurbisher that selectively conditions and cleans generally only the deteriorated regions of a polishing surface on a polishing pad in situ and in real-time while a microelectronic substrate (e.g., a semiconductor wafer) is polished. An important aspect of the invention is that the pad refurbisher travels with the wafer carrier and positions a refurbishing element proximate to the wafer carrier without limiting the travel of the wafer carrier or over-conditioning unused regions on the polishing surface of the polishing pad. Another important aspect of the invention is that the refurbishing element may have a pad conditioner and a pad cleaner to simultaneously condition and clean the polishing surface in situ and in real-time while a wafer is polished. The pad refurbisher of the invention accordingly provides a clean and properly conditioned polishing surface on the polishing pad that enhances the uniformity of the finished surface on the wafer and the throughput of the CMP process. FIGS. 2–6, in which like reference numbers refer to like parts throughout the various views, illustrate pad refurbishers in accordance with the invention.

Figure 1:
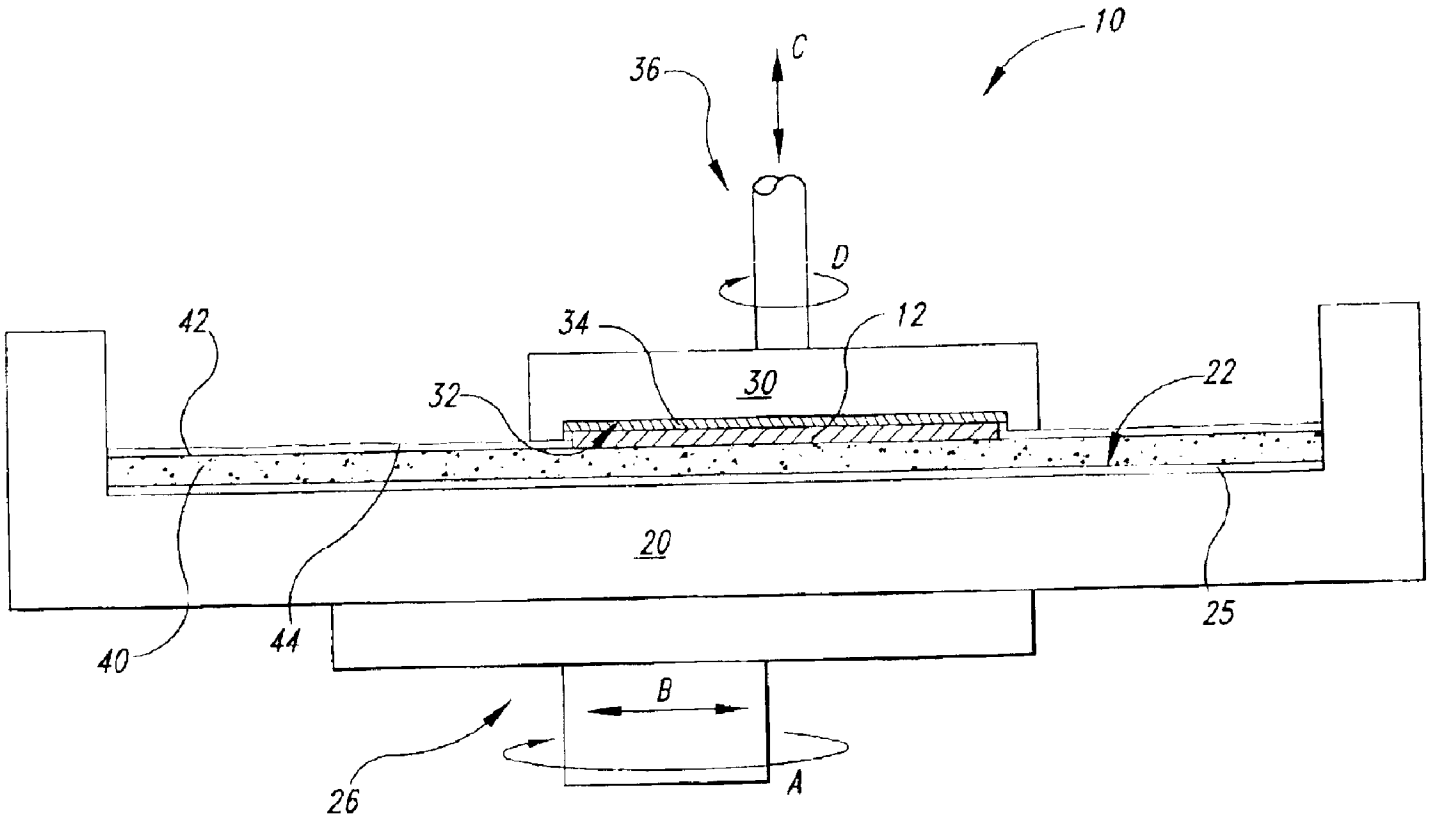
Fig. 1 (Prior Art)
FIG. 1 is a schematic cross-sectional view of a chemical-mechanical polishing machine in accordance with the prior art.
Figure 2:
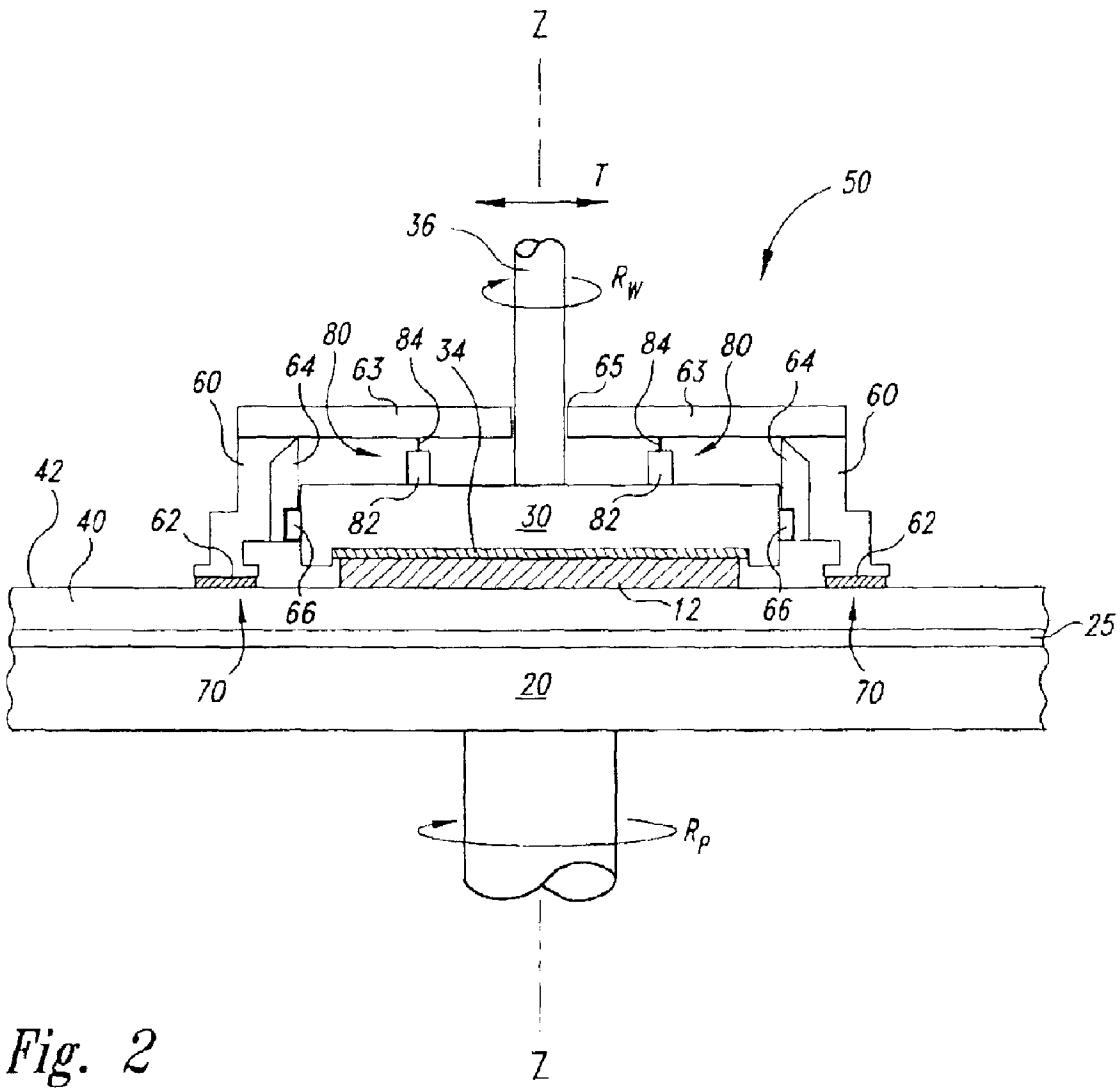
FIG. 2 is a schematic cross-sectional view of a pad refurbisher in accordance with the invention.

FIG. 2 illustrates a pad refurbisher 50 in accordance with the invention. The pad refurbisher 50 has a body 60 attached to a wafer carrier 30 of a polishing machine, such as the polishing machine 10 shown in FIG. 1. The body 60 has a distal face 62 positioned proximate to the perimeter of the wafer carrier 30 and facing toward the polishing surface 42 of the polishing pad 40. A refurbishing element 70 is attached to the distal face 62. The refurbishing element 70 is preferably a pad conditioner or a pad cleaner. In the case of a pad conditioner, the refurbishing element 70 is preferably a separate pad with a plurality of embedded diamonds, or in other embodiments the diamonds may be embedded directly into the distal face 62. In the case of a pad cleaner, the refurbishing element 70 may be a brush or a number of fluid jets attached to the distal face 62 of the body 60. Both the pad conditioner and the pad cleaner are directed towards the polishing surface 42 of the polishing pad 40 to be selectively engaged with the polishing surface 42, as discussed in detail below.

The body 60 may be fixed to the wafer carrier 30, or as shown in FIG. 2, the body 60 may be slidably attached to the wafer carrier 30 to move along a vertical axis substantially normal to the polishing surface 42 of a polishing pad 40 (shown by axis Z—Z). A vertical slot 64 extends along an inner wall of the body 60 facing the wafer carrier 30 to slidably receive a key 66 protruding from the perimeter of the wafer carrier 30. As the wafer carrier 30 rotates, the key 66 engages the side wall of the slot 64 to impart the rotational movement of the wafer carrier 30 to the body 60. The key 66 also slides within the slot 64 as the body 60 moves vertically along the Z—Z axis with respect to the wafer carrier 30 to allow the distal face 62 of the body 60 to be selectively positioned proximate to the polishing surface 42.

In a preferred embodiment, the body 60 is moved along the vertical axis Z—Z with respect to the wafer carrier 30 by a number of linear displacement actuators 80 positioned between a support member 63 attached to the body 60 and the top surface of the wafer carrier 30. The actuators 80 may be pneumatic cylinders, hydraulic cylinders, servomotors, springs, or any other suitable device that provides linear displacement between objects. The support member 63 may be a beam or plate connected to the body 60 (as shown in FIG. 2), or the support member may be made integrally with the body 60. A hole 65 through the support member 63 is positioned to slidably receive the shaft/actuator 36 of the wafer carrier 30 and allow the support member 63 to move along the vertical axis Z—Z with respect to the actuator 36.

The actuators 80 preferably have a housing 82 attached to the wafer carrier 30 and an extensible rod 84 attached to the support member 63. As the rods 84 push against or pull on the support member 63, the body 60 moves upward or downward, respectively, along the vertical axis Z—Z with respect to the wafer carrier 30 to adjust the position of the distal face 62 with respect to the pad 40.

In other embodiments, the actuators 80 may act directly against the body 60 instead of the support member 63. For example, the actuator may be a motor (not shown) that rotates a drive gear (not shown) against a rack of teeth (not shown). The motor is connected to one of the wafer carrier 30 or the body 60, and the rack of teeth is positioned on the other of the wafer carrier 30 or the body 60. As the motor rotates the drive gear against the teeth, the drive gear moves the body 60 vertically with respect to the wafer carrier 30. Importantly, the actuator acts against the wafer carrier 30 and either the body 60 or a support member 63 connected to the body 60 to selectively move the body 60 vertically with respect to the wafer carrier 30 along the vertical axis Z—Z.

The actuators may be controlled manually or by a processor to selectively engage the refurbishing element 70 with the polishing surface 42 of the pad 40. In general, the refurbishing element 70 is selectively engaged with the polishing pad 40 on the areas of the planarizing surface 42 that contact the wafer 12. Since the wafer 12 usually contacts the pad 40 in a concentric band at a medial radial distance from the center of the pad 40, the actuators 80 are preferably controlled to lower the refurbishing element against the polishing surface 42 in the area defined by the concentric band. The actuators 80 may also control the pressure between the refurbishing element 70 and the pad 40 to provide a substantially constant pressure therebetween that does not affect the pressure between the wafer 12 and the pad 40. In one embodiment, the actuators 80 are manually set to position the body 60 so that the refurbishing element 70 engages the polishing surface 42 when the wafer carrier 30 presses the wafer 12 against the pad 40. To manually set the actuators, the wafer 12 is placed against a reference surface and then the refurbishing element 70 is lowered against the reference surface. The reference surface can be either the polishing pad 40 or another platform (not shown). In another embodiment, the actuators 80 are springs that bias the refurbishing element 70 against the polishing surface 42 to provide a substantially constant pressure between the refurbishing element 70 and the polishing pad 40. When the actuators are springs, the refurbishing element 70 is preferably positioned slightly below the face of the wafer 12 when the wafer 12 is off of the pad 40 so that the refurbishing element 70 engages the polishing surface 42 as the wafer carrier 30 presses the wafer 12 against the polishing pad 40.

In operation, the wafer carrier 30 is lowered to engage the wafer 12 with the polishing surface 42 of the polishing pad 40. As discussed above with respect to FIG. 1, the platen 20 and polishing pad 40 rotate in a direction $R_p$ while the wafer carrier 30 rotates the wafer 12 in a direction $R_w$. The wafer carrier 30 also translates the wafer 12 in the direction T across the polishing surface 42 of the polishing pad 40. As the wafer 12 is polished on the polishing surface 42, the actuators 80 position the body 60 with respect to the wafer carrier 30 to selectively engage the refurbishing element 70 with the polishing surface 42. The polishing surface 42 surrounding the wafer 12 is accordingly conditioned (when the refurbishing element is a pad conditioner) or cleaned (when the refurbishing element 70 is a cleaning element) while the wafer 12 is polished. The actuators 80 selectively disengage the refurbishing element 70 from the polishing surface 42 by extending the rods 84 against the support structure 63 to move the body 60 upwardly along the vertical axis Z—Z. The refurbishing element 70 is selectively removed from the polishing surface 42 over areas of the polishing pad 40 that do not need to be conditioned or cleaned. Thus, by selectively engaging and disengaging the refurbishing element 70 with the polishing surface 42, the pad refurbisher 50 can selectively condition or clean only the deteriorated areas on the polishing surface 42 that need to be brought back to an acceptable polishing condition.

The body 60 and the distal face 62 of the body 60 are shaped to position the refurbishing element 70 proximate to the perimeter of the wafer carrier 30 about at least a portion of the perimeter of the wafer carrier 30. For example, the body 60 may be attached to only a single side of the wafer carrier 30, and the body 60 may be shaped so that the distal face 62 and refurbishing element 70 are positioned asymmetrically about a fraction of the perimeter of the wafer carrier 30. In some instances, however, an asymmetrical mounting of the body 60 may impart asymmetrical forces on the wafer carrier 30. In particular, as the wafer carrier 30 rotates an asymmetrically positioned distal face 62 and refurbishing element 70 across the polishing pad 40, the centrifugal force of the refurbishing element 70 may cause the wafer carrier 30 to wobble. Also, since the polishing pad 40 will exert a force on the refurbishing element 70, an asymmetrically positioned refurbishing element 70 will cause the force between the wafer 12 and the polishing pad 40 to be uneven across the surface of the wafer 12. Accordingly, the body 60 is preferably shaped and attached to the wafer carrier 30 to symmetrically position the distal face 62 and refurbishing element 70 with respect to the center of the wafer carrier 30, thus reducing or eliminating any uneven forces on the wafer caused by an asymmetrical design.

Figure 3:
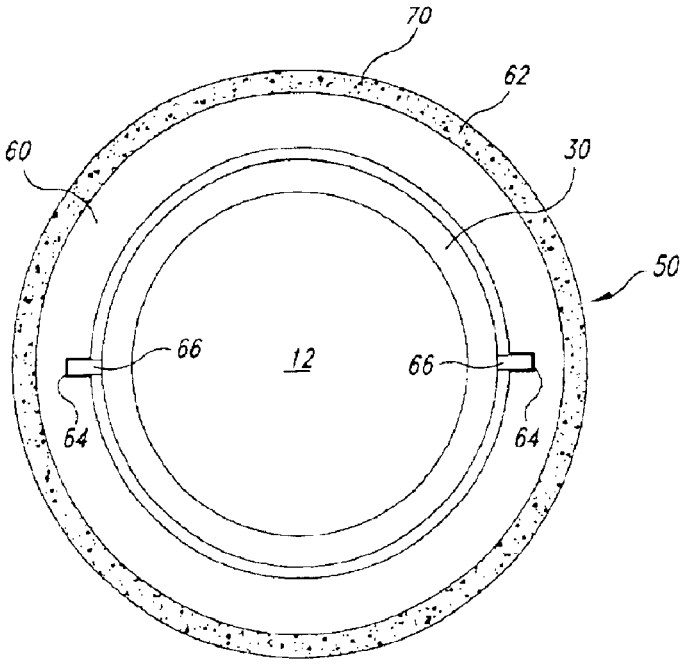
FIG. 3 is a bottom plan view of an embodiment of the pad refurbisher of FIG. 2.
Figure 4:
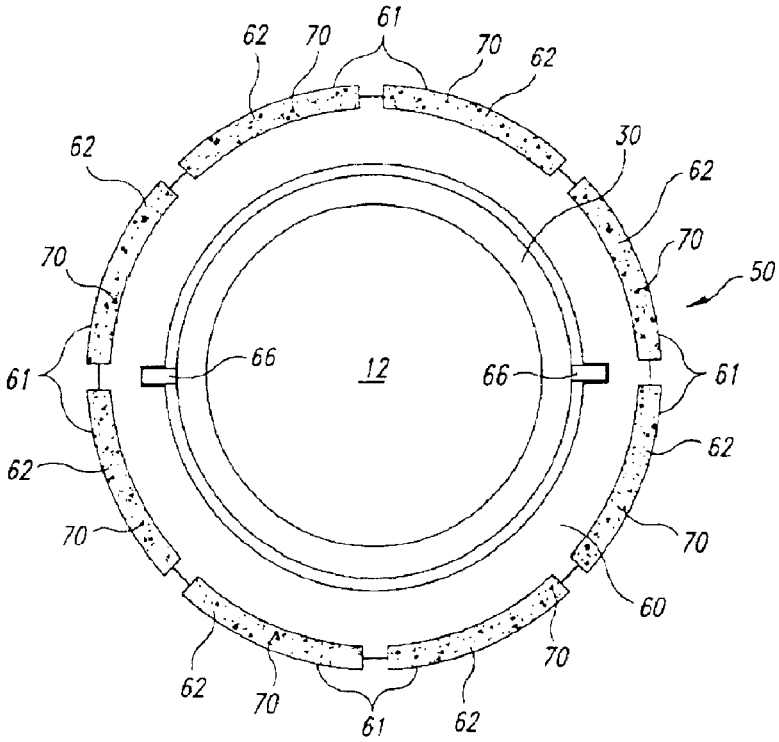
FIG. 4 is a bottom plan view of another embodiment of the pad refurbisher of FIG. 2.

FIGS. 3 and 4 illustrate two embodiments of the pad refurbisher 50 in which the body 60, the distal face 62, and the refurbishing element 70 are symmetrically positioned with respect to the center of the wafer carrier 30. It will be appreciated that the invention is not limited to the embodiments illustrated in FIGS. 3 and 4, as other symmetrical configurations are within the scope of the invention. Referring to FIG. 3, the body 60 is a cylindrical sleeve positioned adjacent to the perimeter of the wafer carrier 30, and the distal face 62 is a continuous ring spaced radially apart from the perimeter of the wafer carrier 30. The refurbishing element 70 substantially covers the complete surface area of the distal face 62, and not just a portion as shown in FIG. 3. Referring to FIG. 4, the body 60 is a cylindrically shaped sleeve positioned adjacent to the perimeter of the wafer carrier with a number of arcuate segments 61 spaced radially apart from the perimeter of the wafer carrier 30. The arcuate segments 61 are separated from one another by a substantially equal angular distance with respect to the wafer carrier 30. The distal face 62 of the body 60 is defined by the bottom surface of each of the arcuate segments 61, and a refurbishing element 70 is attached to the distal face 62 on each of the arcuate segments 61 to condition or clean the polishing surface 42, as discussed above. In another embodiment, pad conditioners are attached to some of the arcuate segments 61 and pad cleaners are attached to other arcuate segments 61 so that the polishing surface 42 may be simultaneously cleaned and conditioned.

Figure 5:
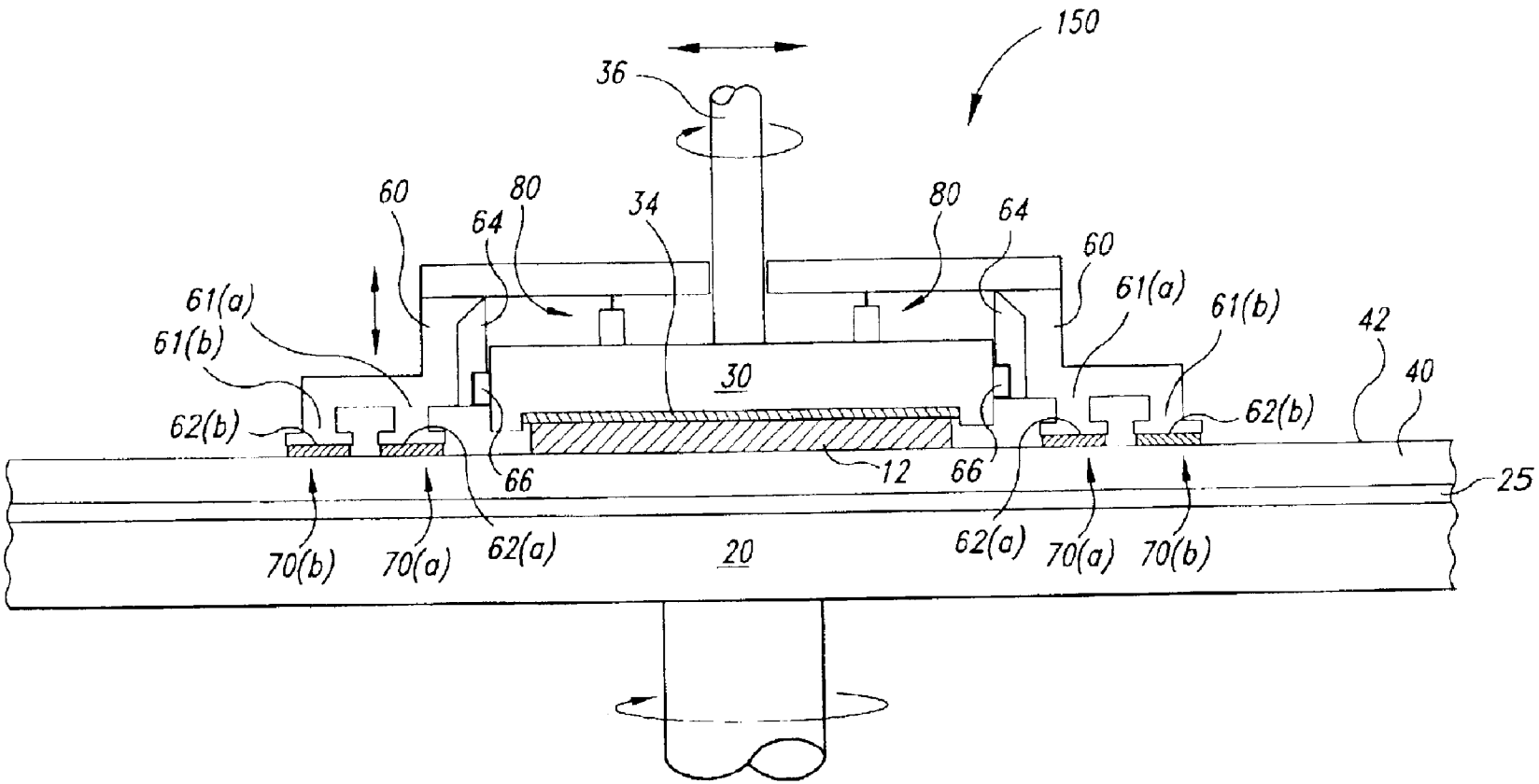
FIG. 5 is a schematic cross-sectional view of another pad refurbisher in accordance with the invention.
Figure 6:
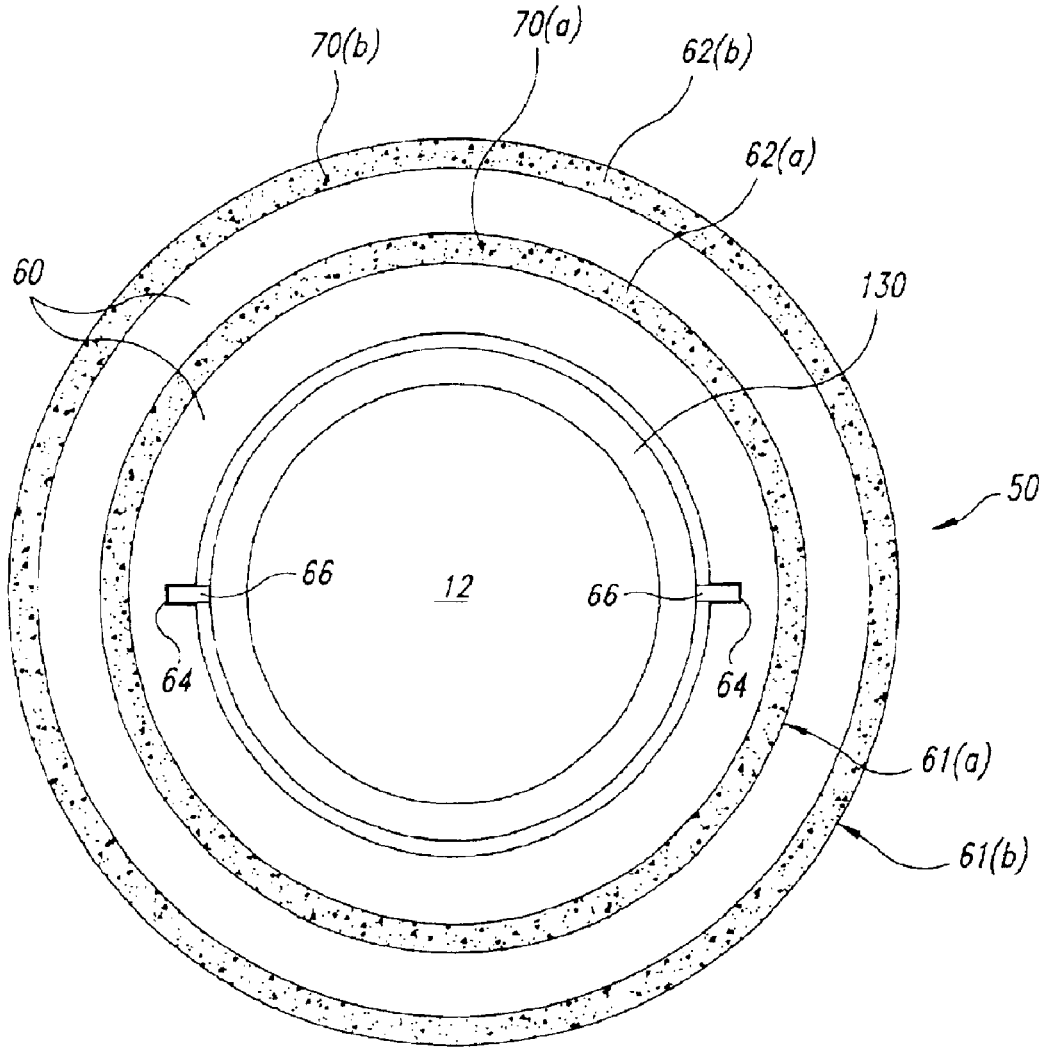
FIG. 6 is a bottom plan view of the pad refurbisher of FIG. 5.

FIG. 5 illustrates another embodiment of a pad refurbisher 150 in which the body 60 has inner and outer rings 61(a) and 61(b), respectively positioned proximate to the perimeter of the wafer carrier 30. A first refurbishing element 70(a) is positioned on a distal face 62(a) of the inner ring 61(a), and a second refurbishing element 70(b) is positioned on a distal surface 62(b) of the outer ring 61 (b). The first refurbishing element 70(a) is either a pad conditioner or a pad cleaner, and the second refurbishing element 70(b) is the other of the pad conditioner or the pad cleaner so that the second refurbishing element 70(b) is not the same as the first refurbishing element 70(a). In a preferred embodiment, the first cleaning element 70(a) is a pad cleaner and the second cleaning element 70(b) is a pad conditioner to prevent large particles separated from the pad by the pad conditioner 70(b) from engaging the surface of the wafer 12. In this embodiment, therefore, the polishing pad 40 may be selectively conditioned and cleaned in situ and in real-time with the same apparatus. The pad refurbisher 150 illustrated in FIG. 5 operates in the same manner as the pad refurbisher illustrated in FIG. 2, and parts having the same reference numbers in FIGS. 2 and 5 perform the same functions.

In another embodiment, the inner and outer rings 61(a) and 61(b), respectively, of pad refurbisher 150 illustrated in FIG. 5 operate independently from one another. A first actuator (not shown) may be operatively attached to only the inner ring 61(a) and a second actuator (not shown) may be operatively attached to only the outer ring 61(b). The inner and outer rings 61(a) and 61(b) are accordingly separated from one another (not shown) so that they may independently engage the polishing surface 42 of the polishing pad 40.

One advantage of the pad refurbishers 50 and 150 of the present invention is that they selectively condition and/or clean generally only the deteriorated areas on the polishing surface that need to be brought back to an acceptable polishing condition. By attaching the pad refurbisher to the wafer carrier so that the refurbishing element travels with the wafer carrier, and by controlling the vertical motion of the refurbishing element with respect to the wafer carrier, the refurbishing element may be selectively engaged with the deteriorated areas on the pad. Moreover, by positioning the refurbishing element proximate to the wafer carrier, only a slightly larger area than that of the wafer carrier is conditioned or cleaned even when the refurbishing element continuously engages the pad. Therefore, compared to conventional conditioners, the pad refurbisher of the present invention reduces over-conditioning of areas on the polishing surface that do not require conditioning or cleaning.

Another advantage of the present invention is that the pad refurbishers 50 and 150 condition and/or clean a polishing surface of a polishing pad in situ and in real-time while a wafer is planarized. Since the cleansing element 70 may be selectively engaged and disengaged with the polishing pad from the wafer carrier 30, the wafer 12 may be polished while the polishing surface 42 of the pad 40 is conditioned and/or cleaned. Thus, compared to some conditioning devices that cannot simultaneously condition the pad and polish the wafer, the pad refurbisher 50 enhances the throughput of the CMP process because the down-time to condition and clean the polishing pad is significantly reduced or even eliminated.

From the foregoing it will be appreciated that, although specific embodiments of the invention have been described herein for purposes of illustration, various modifications may be made without deviating from the spirit and scope of the invention. For example, the apparatus and method may also be used in chemical-mechanical polishing of other microelectronic substrates, such as field emission displays, in addition to semiconductor wafers. Accordingly, the invention is not limited except as by the appended claims.

We claim:

1. A pad refurbisher for in situ, real-time refurbishing of a polishing surface on a polishing pad used in chemical-mechanical polishing of a semiconductor wafer, comprising:

a body adapted for attachment to a wafer carrier of a chemical-mechanical polishing machine with the body having *a first ring and a second ring each with* a face positioned proximate to a perimeter portion of the wafer carrier and facing the polishing surface of the polishing pad, the body being adapted to travel with the wafer carrier as the wafer carrier moves over the polishing pad wherein the body is movably attached to the wafer carrier; and

[a refurbishing element connected to the face of the body] *a first refurbishment element connected to the face of the first ring and a second refurbishment element connected to the face of the second ring, the first ring operably coupled to a first linear actuator configured to independently move the first ring downwardly to selectively engage the first refurbishment element with the polishing surface and upwardly with respect to the wafer carrier and the second ring to selectively disengage the first refurbishment element from the polishing surface and the second ring operably coupled to a second linear actuator configured to independently move the second ring downwardly to selectively engage the second refurbishment element with the polishing surface and upwardly with respect to the wafer carrier and the first ring to selectively disengage the second refurbishment element from the polishing surface, the first ring being positioned radially outward from the perimeter of the wafer carrier and the second ring being positioned radially outward from the first ring,* the *first and the second* refurbishing [element] *elements* being adapted to engage the polishing surface substantially adjacent to the perimeter portion of the wafer carrier and traveling with the wafer carrier while the wafer carrier moves the wafer over the polishing surface.

2. The pad refurbisher of claim 1 wherein the body is fixed to the wafer carrier.

3. The pad refurbisher of claim 1 wherein the body is slidably attached to the wafer carrier.

4. The pad refurbisher of claim 3, further comprising a linear actuator attached to the body, wherein the actuator independently moves the body with respect to the wafer carrier along an axis substantially normal to the polishing surface to selectively engage the refurbishing element with areas on the polishing surface in need of cleansing and to selectively disengage the refurbishing element from areas on the pad in adequate condition.

5. The pad refurbisher of claim 1 wherein the face is a distal face of the body defining a ring positioned radially outwardly from the perimeter of the wafer carrier.

6. The pad refurbisher of claim 1 wherein [the body has] *the first ring and the second ring each include* a plurality of arcuate segments positioned radially outwardly from the perimeter of the wafer carrier, the arcuate segments being spaced apart from one another around the wafer carrier and each arcuate segment having a distal face facing generally towards the polishing surface of the polishing pad.

7. The pad refurbisher of claim 1 wherein *one of* the refurbishing [element] *elements* is a brush comprising a plurality of bristles extending downwardly from the face towards the polishing surface, the bristles engaging the polishing surface to clean waste particles from the pad.

8. The pad refurbisher of claim 1 wherein *one of* the refurbishing [element] *elements* is a pad conditioner that removes a layer of pad material from polishing surface of the pad to form a new polishing surface on the polishing pad.

9. The pad refurbisher of claim 8 wherein the pad conditioner comprises a pad with a plurality of embedded diamonds, the pad being connected to the distal surface of the body.

10. The pad refurbisher of claim 1 wherein the body has a first ring with a first refurbishing element and a second ring with a second refurbishing element, the first ring being positioned radially outwardly from the perimeter of the wafer carrier and the second ring being positioned radially outwardly from the first ring.

11. The pad refurbisher of claim 10 wherein the first refurbishing element is a pad cleaner and the second refurbishing element is a pad conditioner.

12. The pad refurbisher of claim 1 wherein the body is adapted to be symmetrically positioned about the center of the wafer carrier.

13. A polishing machine for chemical-mechanical polishing of a semiconductor wafer, comprising:

a platen having an upper surface;

a polishing pad positioned on the upper surface of the platen, the polishing pad having a polishing surface facing away from the platen, a wafer carrier for carrying the wafer, the wafer carrier being positioned over the polishing pad and moveable along an axis substantially normal to the upper surface of the platen to engage the wafer with the polishing pad, wherein at least one of the platen and the wafer carrier moves with respect to the other to impart relative motion between the wafer and the polishing pad; and a pad refurbisher having a body *including a first ring and a second ring each* with a face positioned proximate to a perimeter portion of the wafer carrier and facing generally towards the polishing surface [and a refurbishing element connected to the face], *the first ring having a first refurbishment element connected to the face thereof, the first ring operably coupled to a first linear actuator configured to independently move the first ring downwardly to selectively engage the first refurbishment element with the polishing surface and upwardly with respect to the wafer carrier and the second ring to selectively disengage the first refurbishment element from the polishing surface and the second ring having a second refurbishment element connected to the face thereof, the second ring operably coupled to a second linear actuator configured to independently move the second ring downwardly to selectively engage the second refurbishment element with the polishing surface and upwardly with respect to the wafer carrier and the first ring to selectively disengage the second refurbishment element from the polishing surface, the first ring being positioned radially outward from the perimeter of the wafer carrier and the second ring being positioned radially outward from the first ring,* the body being attached to the wafer carrier so that the body and *the first and the second* refurbishing [element] *elements* travel with the wafer carrier as the wafer carrier moves with respect to the polishing pad, wherein the *first* refurbishing element engages the polishing surface substantially adjacent to the perimeter portion of the wafer carrier while the wafer carrier moves the wafer over the polishing surface and wherein the body is movably attached to the wafer carrier.

14. The polishing machine of claim 13 wherein the body is fixed to the wafer carrier.

15. The polishing machine of claim 13 wherein the body is slidably attached to the wafer carrier.

16. The polishing machine of claim 15, further comprising a linear actuator attached to the body, wherein the actuator independently moves the body downwardly and upwardly with respect to the wafer carrier along an axis substantially perpendicular to the polishing surface to selectively engage the refurbishing element with areas on the polishing surface in need of cleansing and to selectively disengage the refurbishing element from areas on the pad in adequate condition.

17. The polishing machine of claim 13 wherein the face of the body is a ring positioned radially outwardly from the perimeter of the wafer carrier.

18. The polishing machine of claim 13 wherein [the body has] *the first ring and the second ring each include* a plurality of arcuate segments positioned radially outwardly from the perimeter of the wafer carrier, the arcuate segments being spaced apart from one another around the wafer carrier and each arcuate segment having a distal face facing generally towards the polishing surface of the polishing pad.

19. The polishing machine of claim 13 wherein *one of* the refurbishing [element] *elements* is a brush comprising a plurality of bristles extending downwardly from the face towards the polishing surface, the bristles engaging the polishing surface to clean waste particles from the pad.

20. The polishing machine of claim 13 wherein *one of* the refurbishing [element] *elements* is a pad conditioner that removes a layer of pad material from polishing surface of the pad to form a new polishing surface on the polishing pad.

21. The polishing machine of claim 20 wherein the pad conditioner comprises a pad with a plurality of embedded diamonds, the pad being connected to the distal surface of the body.

22. The polishing machine of claim 13 wherein the body has a first ring with a first refurbishing element and a second ring with a second refurbishing element, the first ring being positioned radially outwardly from the perimeter of the wafer carrier and the second ring being positioned radially outwardly from the first ring.

23. The polishing machine of claim 13 wherein the first refurbishing element is a pad cleaner and the second refurbishing element is a pad conditioner.

24. The polishing machine of claim 13 wherein the pad refurbishing element is symmetrically positioned about the center of the wafer carrier.

25. A method for refurbishing a polishing pad, comprising the steps of:

providing a pad refurbisher having a body *including a first ring and a second ring each* with a face positioned proximate to a perimeter portion of a wafer carrier of a chemical-mechanical polishing machine and facing generally towards the polishing surface, and a *first* refurbishing element connected to the face of the [body] *first ring and a second refurbishment element connected to the face of the second ring*, the body being movably attached to the wafer carrier;

*selectively* engaging [the pad] *one of the first and the second* refurbishing [element] *elements* with the polishing pad; and moving at least one of the wafer carrier and the polishing pad with respect to the other to pass *at least one of* the refurbishing [element] *elements* across the polishing pad.

26. The method of claim 25 wherein the *selectively* engaging step comprises selectively lowering the body towards the polishing pad while the wafer carrier presses a wafer against the polishing pad and moves the wafer over the polishing pad to polish the wafer.

27. The method of claim 26 wherein the method further comprises selectively disengaging *one of* the refurbishing [element] *elements* from the *polishing* pad.

28. The method of claim 25 wherein the engaging step comprises lowering the wafer carrier until *one of* the refurbishing [element] *elements* and a wafer abut the polishing pad.

29. The method of claim 25 wherein the *first* refurbishing element comprises a pad conditioner and *the second refurbishment element comprises* a pad cleaner, and wherein the engaging step comprises pressing the pad conditioner and the pad cleaner against the polishing pad.

30. The method of claim 26 wherein *one of* the refurbishing [element] *elements* is selectively engaged with deteriorated portions of the polishing pad with accumulations of waste matter.

*31. A pad refurbisher for refurbishing a polishing surface on a polishing pad used in chemical-mechanical polishing of a semiconductor wafer, comprising:*

*a body adapted for attachment to a wafer carrier of a chemical-mechanical polishing machine with the body having a first ring and a second ring each with a face positioned proximate to a perimeter portion of the wafer carrier and facing the polishing surface of the polishing pad; and*

*a first refurbishment element connected to the face of the first ring and a second refurbishment element connected to the face of the second ring, the first ring operably coupled to a first linear actuator configured to independently move the first ring downwardly to selectively engage the first refurbishment element with the polishing surface and upwardly with respect to the wafer carrier and the second ring to selectively disengage the first refurbishment element from the polishing surface and the second ring operably coupled to a second linear actuator configured to independently move the second ring downwardly to selectively engage the second refurbishment element with the polishing surface and upwardly with respect to the wafer carrier and the first ring to selectively disengage the second refurbishment element from the polishing surface, the first ring being positioned radially outward from the perimeter of the wafer carrier and the second ring being positioned radially outward from the first ring, the first and the second refurbishing elements being adapted to engage the polishing surface substantially adjacent to the perimeter portion of the wafer carrier.*

*32. The pad refurbisher of claim 31 wherein the body is fixed to the wafer carrier.*

*33. The pad refurbisher of claim 31 wherein the body is slidably attached to the wafer carrier.*

*34. The pad refurbisher of claim 31 wherein the face is a distal face of the body defining a ring positioned radially outwardly from the perimeter of the wafer carrier.*

*35. The pad refurbisher of claim 31 wherein the first ring and the second ring include a plurality of arcuate segments positioned radially outwardly from the perimeter of the wafer carrier, the arcuate segments being spaced apart from one another around the wafer carrier and each arcuate segment having a distal face facing generally towards the polishing surface of the polishing pad.*

*36. The pad refurbisher of claim 31 wherein one of the refurbishing elements is a brush comprising a plurality of bristles extending downwardly from the face towards the polishing surface, the bristles engaging the polishing surface to clean waste particles from the pad.*

*37. The pad refurbisher of claim 31 wherein one of the refurbishing elements is a pad conditioner that removes a layer of pad material from polishing surface of the pad to form a new polishing surface on the polishing pad.*

*38. The pad refurbisher of claim 37 wherein the pad conditioner comprises a pad with a plurality of embedded diamonds, the pad being connected to the distal surface of the body.*

*39. The pad refurbisher of claim 31 wherein the first refurbishing element is a pad cleaner and the second refurbishing element is a pad conditioner.*

*40. The pad refurbisher of claim 31 wherein the body is adapted to be symmetrically positioned about the center of the wafer carrier.*

*41. A polishing machine for chemical-mechanical polishing of a semiconductor wafer, comprising:*

*a platen having an upper surface;*

*a polishing pad positioned on the upper surface of the platen, the polishing pad having a polishing surface facing away from the platen,*

*a wafer carrier for carrying the wafer; and*

*a pad refurbisher having a body attached to the wafer carrier, the body including a first ring having a first refurbishment element and a second ring having a second refurbishment element, the first operably coupled to a first linear actuator configured to independently move the first ring downwardly to selectively engage the first refurbishment element with the polishing surface and upwardly with respect to the wafer carrier and the second ring to selectively disengage the first refurbishment element from the polishing surface and the second ring operably coupled to a second linear actuator configured to independently move the second ring downwardly to selectively engage the second refurbishment element with the polishing surface and upwardly with respect to the wafer carrier and the first ring to selectively disengage the second refurbishment element from the polishing surface, the first ring being positioned radially outward from the perimeter of the wafer carrier and the second ring being positioned radially outward from the first ring.*

*42. The polishing machine of claim 41 wherein the first and the second ring each comprise a face positioned proximate to a perimeter portion of the wafer carrier and facing generally towards the polishing surface.*

*43. The polishing machine of claim 42 wherein the first refurbishing element is connected to the face of the first ring and the second refurbishment element is connected to the face of the second ring, and wherein the body being attached to the wafer carrier so that the body and each of the refurbishing elements travel with the wafer carrier as the wafer carrier moves with respect to the polishing pad, and wherein each of the refurbishing elements engages the polishing surface substantially adjacent to the perimeter portion of the wafer carrier while the wafer carrier moves the wafer over the polishing surface.*

*44. The polishing machine of claim 41 wherein the body is fixed to the wafer carrier.*

*45. A method for refurbishing a polishing pad, comprising the steps of:*

*providing a pad refurbisher attached to a wafer carrier, the pad refurbisher having a first ring bearing a first refurbishment element and a second ring bearing a second refurbishment element,*

*selectively engaging one of the first and the second refurbishing elements with the polishing pad; and*

*moving at least one of the wafer carrier and the polishing pad with respect to the other to pass at least one of the refurbishing elements across the polishing pad.*

*46. The method of claim 45 wherein selectively engaging comprises selectively lowering at least one of the refurbishing elements towards the polishing pad while the wafer carrier presses a wafer against the polishing pad and moves the wafer over the polishing pad to polish the wafer.*

*47. The method of claim 45 further comprising selectively disengaging the one of refurbishing elements from the polishing pad.*

*48. The method of claim 47 wherein one of the refurbishing elements is selectively disengaged from relatively unused portions of the polishing pad not having accumulations of waste matter.*

*49. The method of claim 45 wherein the selectively engaging comprises lowering the wafer carrier until one of the refurbishing elements and a wafer abut the polishing pad.*

*50. The method of claim 45 wherein one of the refurbishing elements is selectively engaged with deteriorated portions of the polishing pad with accumulations of waste matter.*

*51. The method of claim 45 wherein one of the refurbishing elements is selectively engaged and disengaged from the polishing pad as a function of the use of portions of the pad.*

*52. A pad refurbisher for refurbishing a polishing surface on a polishing pad used in chemical-mechanical polishing of a semiconductor wafer, comprising:*

*a body adapted for attachment to a wafer carrier of a chemical-mechanical polishing machine with the body having a first ring and a second ring each with a face positioned proximate to a perimeter portion of the wafer carrier and facing the polishing surface of the polishing pad, the body being moveably attached to the wafer carrier; and*

*a first refurbishment element connected to the face of the first ring and a second refurbishment element connected to the face of the second ring, the first ring operably coupled to a first linear actuator configured to independently move the first ring downwardly to selectively engage the first refurbishment element with the polishing surface and upwardly with respect to the wafer carrier and the second ring to selectively disengage the first refurbishment element from the polishing surface and the second ring operably coupled to a second linear actuator configured to independently move the second ring downwardly to selectively engage the second refurbishment element with the polishing surface and upwardly with respect to the wafer carrier and the first ring to selectively disengage the second refurbishment element from the polishing surface, the first ring being positioned radially outward from the perimeter of the wafer carrier and the second ring being positioned radially outward from the first ring, the first and the second refurbishing elements being adapted to engage the polishing surface substantially adjacent to the perimeter portion of the wafer carrier.*

*53. The pad refurbisher of claim 52 wherein the body is fixed to the wafer carrier.*

*54. The pad refurbisher of claim 52 wherein the body is slidably attached to the wafer carrier.*

*55. The pad refurbisher of claim 52 wherein the first ring and the second ring include a plurality of arcuate segments positioned radially outwardly from the perimeter of the wafer carrier, the arcuate segments being spaced apart from one another around the wafer carrier and each arcuate segment having a distal face facing generally towards the polishing surface of the polishing pad.*

*56. The pad refurbisher of claim 52 wherein one of the refurbishing elements is a brush comprising a plurality of bristles extending downwardly from the face towards the polishing surface, the bristles engaging the polishing surface to clean waste particles from the pad.*

*57. The pad refurbisher of claim 52 wherein one of the refurbishing elements is a pad conditioner that removes a layer of pad material from polishing surface of the pad to form a new polishing surface on the polishing pad.*

*58. The pad refurbisher of claim 57 wherein the pad conditioner comprises a pad with a plurality of embedded diamonds, the pad being connected to the distal surface of the body.*

*59. The pad refurbisher of claim 52 wherein the first refurbishing element is a pad cleaner and the second refurbishing element is a pad conditioner.*

*60. The pad refurbisher of claim 52 wherein the body is adapted to be symmetrically positioned about the center of the wafer carrier.*

*61. A polishing machine for chemical-mechanical polishing of a semiconductor wafer, comprising:*

*a platen having an upper surface;*

*a polishing pad positioned on the upper surface of the platen, the polishing pad having a polishing surface facing away from the platen;*

*a wafer carrier for carrying the wafer; and*

*a pad refurbisher having a body including a first ring bearing a first refurbishment element and a second ring bearing a second refurbishment element, the body being movably attached to the wafer carrier, the first ring operably coupled to a first linear actuator configured to independently move the first ring downwardly to selectively engage the first refurbishment element with the polishing surface and upwardly with respect to the wafer carrier and second ring to selectively disengage the first refurbishment element from the polishing surface and the second ring operably coupled to a second linear actuator configured to independently move the second ring downwardly to selectively engage the second refurbishment element with the polishing surface and upwardly with respect to the wafer carrier and the first ring to selectively disengage the second refurbishment element from the polishing surface, the first ring being positioned radially outward from the perimeter of the wafer carrier and the second ring being positioned radially outward from the first ring.*

*62. The polishing machine of claim 61 wherein the first ring comprises a face positioned proximate to a perimeter portion of the wafer carrier and facing generally towards the polishing surface.*

*63. The polishing machine of claim 62 wherein the first refurbishing element is connected to the face, and wherein the body being movably attached to the wafer carrier so that the body and the first and the second refurbishing elements travel with the wafer carrier as the wafer carrier moves with respect to the polishing pad, and wherein at least one of the refurbishing elements engages the polishing surface substantially adjacent to the perimeter portion of the wafer carrier while the wafer carrier moves the wafer over the polishing surface.*

*64. The polishing machine of claim 61 wherein the body is fixed to the wafer carrier.*

*65. A method for refurbishing a polishing pad, comprising the steps of:*

*providing a pad refurbisher attached to a wafer carrier, the pad refurbisher having a body including a first ring*

*bearing a first refurbishment element and a second ring bearing a second refurbishment element, the body being movably attached to the wafer carrier;*

*selectively engaging one of the first and the second refurbishing elements with the polishing pad; and*

*moving at least one of the wafer carrier and the polishing pad with respect to the other to pass at least one of the refurbishing elements across the polishing pad.*

*66. The method of claim 65 wherein selectively engaging comprises selectively lowering at least one of the refurbishing elements towards the polishing pad while the wafer carrier presses a wafer against the polishing pad and moves the wafer over the polishing pad to polish the wafer.*

*67. The method of claim 65 further comprising selectively disengaging at least one of the refurbishing elements from the pad.*

*68. The method of claim 67 wherein the at least one of the refurbishing elements is selectively disengaged from relatively unused portions of the polishing pad not having accumulations of waste matter.*

*69. The method of claim 65 wherein the selectively engaging comprises lowering the wafer carrier until one of the refurbishing elements and a wafer abut the polishing pad.*

*70. The method of claim 65 wherein one of the refurbishing elements is selectively engaged with deteriorated portions of the polishing pad with accumulations of waste matter.*

*71. The method of claim 65 wherein one of the refurbishing elements is selectively engaged and disengaged from the polishing pad as a function of the use of portions of the pad.*

* * * * *